United States Patent Office 3,829,495
Patented Aug. 13, 1974

3,829,495
METHOD OF PRODUCING DIMERIZED SATURATED KETONES
Yukio Mizutani, Tokuyama, Yusuke Izumi, Yamaguchi-ken, and Yoshiaki Watanabe, Hikari-shi, Japan, assignors to Tokuyama Sode Kabushiki Kaisha, Yamaguchi-ken, Japan
No Drawing. Continuation-in-part of application Ser. No. 824,673, May 14, 1969, which is a continuation-in-part of application Ser. No. 780,622, Dec. 3, 1968, both now abandoned. This application Jan. 30, 1970, Ser. No. 7,240
Int. Cl. C07c 45/00
U.S. Cl. 260—586 R        10 Claims

ABSTRACT OF THE DISCLOSURE

This invention relates to a method of producing dimerized saturated ketones comprising the steps of heating ketones to be subsequently defined at a temperature of from 60–400° C., together with hydrogen in the presence of a catalyst comprising metallic palladium and a phosphate of at least one metal selected from the group consisting of zirconium, titanium, hafnium, and tin, the said ketones being selected from the group consisting of:
(a) at least one ketone having at least one or both of the two carbon atoms that are attached to the carbonyl group; and
(b) a ketone having at least two hydrogen atoms attached to either one or both of the two carbon atoms that are attached to the carbonyl group, and a ketone having no hydrogen atom whatsoever attached to said carbon atoms.

---

This application is a continuation-in-part of U.S. application Ser. No. 824,673, filed May 14, 1969, now abandoned, which is a continuation-in-part of U.S. application Ser. No. 780,622, filed Dec. 3, 1968, now abandoned.

This invention relates to a method producing dimerized saturated ketones selectively from ketones and hydrogen.

More particularly, this invention relates to a method of reacting ketones and hydrogen using a catalyst consisting essentially of metallic palladium and a phosphate of at least one metal selected from the group consisting of zirconium, titanium, hafnium and tin to effect in a single stage the dimeric condensation and hydrogenation of ketones to thereby produce saturated ketones which have been obtained by the condensation of two molecules (hereinafter referred to as dimerized saturated ketones).

The term "ketones" usually in a generic term of those organic compounds having the atomic group indicated by the formula C=O; i.e., the carbonyl group. However, the ketones that can be applied to the present invention are those which are condensable. Thus, the condensation and saturation reaction between the ketone molecules indicated in the following groups (a) or (b) can be carried out. That is to say, according to the present invention, it is possible (a) to effect the dimeric condensation and saturation reaction between ketone molecules in which at least one hydrogen atom is attached to either one or both of the two carbon atoms that are attached to the foregoing carbonyl group (hereinafter referred to as the carbon atoms of the alpha position) and (b) to effect the condensation and saturation reaction between a ketone molecule in which two or more hydrogen atoms are attached to either one or both of the foregoing carbon atoms of the alpha position and a ketone molecule having no hydrogen atom whatsoever attached to the carbon atoms of the alpha position.

Unless otherwise noted, the term "ketones" as used herein will denote the condensable ketones as hereinabove defined in (a) and (b).

As a method of obtaining saturated ketones by first dimerically condensing the ketones and thereafter effecting the hydrogenation thereof; i.e., a method of obtaining what is referred to hereinabove as dimerized saturated ketones in the present invention, it was the practice in the past to first carry out the condensation reaction of ketones using an alkali, then concentrationg the resulting ketol followed by dehydration to obtain unsaturated ketones wherein the aforesaid ketones have been dimerically condensed, and thereafter submitting these unsaturated ketones to the hydrogenation step to obtain the dimerized saturated ketones. In this method, aside from the fact that the processing steps involved were complicated, there were also such shortcomings as that the yield was low as a result of the relatively low conversion during the condensation step and that there was formed a considerable amount of the by-product carbinol during the hydrogenation step.

As another method, a method has been proposed which comprises producing the dimerized unsaturated ketones by the direct condensation of two molecules of ketones using as catalyst a molecular sieve and thereafter submitting the resulting unsaturated ketones to the hydrogenation step. This method has the drawbacks that not only the catalytic activity of the molecular sieve is inadequate, but also the decline in the activity of the catalyst is great with the passage of the reaction time. In addition, there is the necessity of carrying out the hydrogenation reaction as a separate step after having obtained the dimerized unsaturated ketones.

An object of the present invention is to provide a method by which dimerized saturated ketones can be obtained from starting in good yield and economically advantageously in a single-stage reaction process.

Another object is to provide a method of producing dimerized saturated ketones from starting ketones selectively in good yield in a single-stage reaction process.

A further object is to provide a method of obtaining methyl isobutyl ketone by the single-state reaction process by condensing and saturating two molecules of acetone.

A still further object of the present invention is to provide a new catalyst by means of which the dimeric condensation and hydrogenation reactions of ketones can be carried out in a single stage.

An additional object of this invention is to provide a method of preparing a new catalyst whose activity is particularly high in carrying out the dimeric condensation and hydrogenation reactions of ketones.

Other objects and features of the present invention will become apparent from the following description.

The catalyst used in the present invention is a catalyst system comprising metallic palladium and a phosphate of at least one metal of the group consisting of zirconium, titanium, hafnium, and tin. A description will be given below of the several components which make up the invention catalyst and a method of preparation of the catalyst from these components.

THE METAL PHOSPHATES

The metal phosphates which are used in this invention are obtained by reacting phosphoric acid with one or more water-soluble salt of zirconium, titanium, hafnium and tin, and isolating the resulting precipitate. Since the foregoing reaction is a reaction between the aforesaid metals (Me) and phosphate ions ($PO_4^{-3}$) in an aqueous medium, the aforesaid phosphoric acid need not necessarily be phosphoric acid itself but may be any compound as long as it can provide the phosphate ions ($PO_4^{-3}$) in an aqueous medium. For example, mention can be made of the neutral and acid salts of phosphoric acid including those of sodium, potassium, lithium and ammonium and the acid salts of phosphoric acid, including those of magnesium and calcium, as well as other water-soluble phosphates. Of these, phosphoric acid and the acid salts of phosphoric acid and, in particular, phosphoric acid, are preferred.

On the other hand, as the water-soluble salt of zirconium, titanium, hafnium and tin, any that can provide these metallic ions will do, but especially preferred are the halides, oxyhalides, oxynitrates and oxysulfates of these metals.

Any of the known methods of reacting one or more of the water-soluble salts of zirconium, titanium, hafnium, and tin with the phosphate ions in an aqueous medium to obtain either zirconium, titanium, hafnium, or stannic phosphate may be employed. For instance, any of the methods suggested in the J. Inorg. and Nucl. Chem., 6, 220–235 (1958), ibid., 26, 117–129 (1964) and ibid., 28, 607–613 (1966) can be employed.

Further, while the mole ratio ($PO_4^{-3}$/Me) of the aforesaid phosphate ions ($PO_4^{-3}$) to metal (Me) is imposed no particular restriction and either of the components may be used in a large amount, a range in which one of the components does not exceed three-fold molar quantity of the other is generally convenient from the standpoint of economy. As an example of a most preferred mode, a water-soluble salt of at least one metal selected from the group consisting of zirconium, titanium, and tin is reacted with either phosphoric acid or its water-soluble salt in a mole ratio of the phosphate ions ($PO_4^{-3}$) to the aforesaid metals (Me), i.e., a mole ratio ($PO_4^{-3}$/Me), in a range of 0.6–1.7. In this case, good results are achieved since metal phosphates having large specific surface areas are obtained. In this case, it is especially desirable that the precipitation of the aforesaid metal phosphates is from a solution of a low concentration. And especially desirable results are given when this precipitate is dried without heating.

In addition, the metal phosphates which are obtained by drying the gel-like precipitate formed by reacting the water-soluble salts of the aforesaid metals with the phosphate ions ($PO_4^{-3}$) in an aqueous solution of a pH 3 or more, and preferably pH 12 of less, also have particularly large specific surface areas and hence can be used conveniently. In this case, there being no particular restrictions as to the mole ratio ($PO_4^{-3}$/Me) of the aforesaid phosphate ion ($PO_4^{-3}$) to metal (Me), it is permissible to use either one of the components in an amount greatly in excess of the other. For adjusting the pH of the reaction system to 3–12 in this case, the following methods are preferably employed:

(i) the method of adding a strong alkali to the reaction system, such as caustic alkalis, caustic alkaline earth metals, and alkali carbonates; and (ii) the method of adding ammonia to the reaction system.

In the case of the foregoing method (i), there is, however, the tendency to a part of the resulting metal phosphates being substituted by the alkali or alkaline earth metal ions. On the other hand, when the foregoing method (ii) is employed, a part of the resulting metal phosphates is substituted by ammonium ions. Hence, when the metal phosphates obtained by adjustment of the pH by the foregoing methods (i) and (ii) are to be prepared into the invention catalyst by just mixing with the hereinafter described metallic palladium, it is preferred that the foregoing metal phosphates be converted to their acid-type by further treatment. The conversion of these metal phosphates into their acid-type is imposed no particular restrictions and any of the known techniques can be used. Usually the conversion to the acid-type can be accomplished in the following manner. In the case of the foregoing method (i), the precipitate obtained after completion of the reaction is treated with an acid, thereby substituting the hydrogen ions for the partly substituted alkali or alkaline earth metal ions, whereas in the case of the foregoing method (ii), the precipitate obtained after completion of the reaction is dried by heating, say, at 300–600° C. to thereby decompose and remove the ammonia.

METALLIC PALLADIUM

There is imposed no particular restriction as to the metallic palladium to be used in the present invention, and usually the known metallic palladium, for example, palladium black, may be used as such, or the carrier-supported palladium obtained by supporting the water-soluble palladium salts, such, for example, as palladium sulfate, palladium nitrate, and the palladium halides, on an inert carrier and thereafter submitting to a reducing treatment may also be used.

PREPARATION OF CATALYST

The catalyst to be used in the present invention may be prepared in any manner, provided it contains the hereinbefore described metallic palladium and a phosphate of either zirconium, titanium, hafnium, or tin. For example, usable is that in which the phosphates of the foregoing metals and the metallic palladium which have been separately prepared, are either mixed as obtained or mixed after each of said components have been supported on an inert carrier such as diatomaceous earth, alumina, silica, active carbon, and clay; or that in which the metallic palladium has been supported on the phosphates of the foregoing metals by means, say, of the co-precipitation or the ion-exchange technique to yield a so-called bifunctional catalyst, which is then used in its as-obtained state or after being further supported on the aforesaid inert carriers. The method of preparing the catalyst is thus imposed no particular restriction. Moreover, the invention catalyst may be used in either the powdery or granular form.

While any of the known techniques may be used for obtaining the bifunctional catalyst which consists of metallic palladium supported on the aforesaid metal phosphates, conveniently useable are, for example, (1) the method which comprises adding a water-soluble palladium salt to the system during the reaction of obtaining the aforesaid metal phosphates and dissolving the same therein, followed by evaporating and removing the moisture content and thereafter submitting the phosphate-supported palladium salt to a reducing treatment; (2) the method which comprises immersing the preformed metal phosphates in an aqueous solution of a water-soluble palladium salt, followed by evaporating and removing the moisture content and thereafter submitting phosphate-supported palladium salt to a reducing treatmen; and (3) the method which comprises ion-exchangeably introducing palladium ions to the cationic ion-exchange group of the metal phosphates and thereafter carrying out the reducing treatment. The invention catalyst obtained by these methods (1), (2), and (3) demonstrate a catalytic activity excelling that of catalyst obtained by merely mixing the aforesaid metal phosphates with metallic palladium. When the catalyst is obtained by the hereinabove described methods, (1), (2), and (3), and especially the method (3), an excellent catalyst in which the metallic palladium is deposited uniformly and in a very finely divided state is obtained.

The method of ion-exchangeably introducing the palladium ions to the cationic ion-exchange group of the metal phosphates is not imposed any particular restrictions, but it is usually carried out by the adjustment of the pH of the solution containing the water-soluble palladium salt in preparing the aforesaid bifunctional catalyst. In introducing palladium as ions to the cationic exchange group of the metal phosphates, it is preferred to use a substance which by reacting with the palladium salt forms stable cationic ions of palladium in the aqueous solution. As such a substance, usually convenient are ammonium hydroxide and the water-soluble organic amines such as methylamine and ethylamine. These substances have the advantage that they react with the palladium salts to convert the palladium to stable water-soluble complex cations as well as adjust the pH of the reaction solution at the same time to readily effect the ion exchange of the palladium cations with cations of metal phosphate. Particularly, the instance where the palladium salt is introduced in the form of palladium tetraamine complex ions $[Pd(NH_3)_4]^{2+}$ and the ion exchange of complex ions to the cationic exchange group of the aforesaid metal phosphates is effected using ammonium hydroxide is usually the most effective.

If the pH of the solution is maintained at 3–12, and preferably 4–7, in carrying out the ion exchange of the palladium ions to the cationic exchange group of the metal phosphates, the ion exchange of the palladium ions proceeds preferentially, regardless of the concentration of the palladium ions. On the other hand, when the pH of the solution is less than 3, i.e., a state wherein the hydrogen ion concentration is great, the ion exchange to the cationic exchange group of the metal phosphates of the hydrogen ions takes precedence either inhibiting the introduction of the palladium ions or the palladium remains impregnated in the form of a palladium salt. Hence, as compared with a catalyst which has been prepared in a pH range as previously indicated, that prepared with a solution having a pH of less than 3 tends to be somewhat inferior in its selectivity for the intended dimerized saturated ketones. Again, when the pH of the foregoing solution containing the palladium becomes greater than 12, the palladium does not become fully introduced as ions, with the consequence that the selectivity for dimerized saturated ketones of the resulting catalyst tends to become somewhat inferior in this case also.

Further, as the method of introducing the palladium ions to the cationic exchange group of the zirconium, titanium, hafnium or stannic phosphate, usually used with advantage is either the simultaneous ion exchange method wherein the palladium cations are introduced by ion exchange during the time of obtaining the aforesaid metal phosphates or the successive ion exchange method wherein the palladium cations are introduced to the cationic exchange group of said metal phosphates after first having obtained these metal phosphates. The catalyst obtained by the simultaneous ion exchange method is particularly effective when used as catalyst in the present invention.

The simultaneous ion exchange method is carried out in the following manner. For example, a palladium salt is first dissolved in an aqueous solution containing one or more water-soluble salts of zirconium, titanium, hafnium and tin. Then this aqueous solution is reacted with either phosphoric acid or a water-soluble phosphate in the copresence of a substance which can form stable palladium cations in the aqueous solution by reacting with the palladium salt (hereinafter referred to as a palladium cation forming agent), e.g., ammonium hydroxide, while maintaining the pH of the reaction solution in the range of 3–12, to thereby prepare a hydrogel of the metal phosphate in which the ion exchange with palladium cations has been effected, and thereafter separating the hydrogel by filtration. The foregoing palladium cation forming agent may be added to the phosphoric acid or the phosphate aqueous solution in advance, or it may be added to the solution after formation of the foregoing hydrogel.

On the other hand, the successive ion exchange method is carried out in the following manner.

Zirconium, titanium, hafnium, or stannic phosphate, which has been prepared in advance, is immersed in a solution containing stable palladium cations, i.e.,

$[PdA_4]$—, wherein A is $NH_3$, $CH_3NH_2$ or $C_2H_5NH_2$, and the ion exchange is carried out in a standstill state, or the foregoing metal phosphate is packed in a column through which is passed a solution containing the palladium cations to effect the ion exchange in an optional manner. Thereafter, the ion-exchanged metal phosphate is thoroughly washed with water. Thus is obtained the metal phosphate in which the ion exchange with palladium cations has been effected.

Hence, there is no restriction at all as to the palladium compound to be used in effecting the ion exchange of the cationic exchange group of the aforesaid metal phosphates as long as the palladium compound is one which can provide palladium ions in an aqueous medium. Usually, the water-soluble palladium salts such as palladium sulfate, palladium nitrate, and palladium halides are conveniently used.

The phosphates of at least one metal selected from the group consisting of zirconium, titanium, hafnium, and tin, which have been obtained above described or by other known methods and having been introduced with palladium cations by means of the ion exchange technique, are thereafter submitted to a reducing treatment to convert the palladium cations into metallic palladium. Thus, the metal phosphates can be converted to their acid-type and at the same time the metal phosphates can be deposited with metallic palladium uniformly and in a very finely divided state. In accordance with the hereinbefore described ion exchange method, the palladium is deposited on the aforesaid metal phosphates as very minute palladium of particle diameter not greater than 100 A. (Angstrom).

As the aforesaid reducing treatment to be employed in the present invention included are, for example, that of calcination of the ion-exchanged metal phosphates in a stream of hydrogen at 100–600° C., and preferably 300–500° C.; that of first calcining in air at 200–500° C., and thereafter carrying out the reduction in a reducing atmosphere such as a hydrogen stream; and that of carrying out the reducing treatment using the known reducing agents such, for example, as formaldehyde, formic acid, sodium borohydride, and hydrazine and thereafter submitting the metal phosphate to an acid treatment to remove the ammonium ion in those cases where the foregoing reducing agents have been used.

The amount of metallic palladium contained in the invention catalyst conveniently ranges between 0.1% and 5.3% by weight, and particularly 0.2% and 3.0% by weight, based on the metal phosphate. When the content of metallic palladium is less than the above range, by-products predominantly of the trimeric condensation products of the starting ketone increase, whereas when palladium content exceeds the foregoing range, this also is not to be desired, since the formation of carbinol tends to increase.

The activity site that is effective for the dimerized condensation reaction (hereinafter referred to as simply condensation) of ketones in the case of the catalyst used in the present invention is the acid ion exchange group of the phosphates of one or more metals selected from the group consisting of zirconium, titanium, hafnium, and tin, while the activity site that is effective for the hydrogenation reaction of the dimerized unsaturated ketones formed by the condensation is believed to be the metallic palladium.

REACTION CONDITIONS

While the reaction conditions for obtaining dimerized saturated ketones by reacting the ketones will vary somewhat in this invention depending upon the starting ketones that are used and the type of reactor, in general, a reaction temperature of 60–400° C., and preferably 80–250° C., a reaction pressure of 1–60 kg./cm.², and preferably 10–50 kg./cm.², and a mole ratio of hydrogen to ketones, i.e., hydrogen/ketones, in the range of 0.01–2.0, and preferably 0.1–1.0, can be conveniently employed, but the foregoing conditions are not necessarily limited to these ranges.

Further, the starting ketones may be either a liquid or vapor phase under the reaction conditions, but since there is a tendency to an increase in the formation of various by-products of which the trimerized condensation product predominates when the ketones are reacted while they are maintained in the vapor phase, it is usually advantageous in most cases to carry out the reaction while maintaining the ketones in a liquid phase. In this latter case, i.e., where the reaction is conducted while maintaining the ketones in a liquid phase, while good results are generally given when, for example, the liquid hourly space velocity of the ketones is held within the range of 1–20 (liquid volume/catalyst volume/hour), a velocity slower or faster than this range may also be used.

The formation of by-products in this invention, especially the formation of carbinol, is influenced by the reaction temperature and the mole ratio of hydrogen to the starting ketones, and especially the latter. Hence, suitable conditions should be chosen in accordance with the starting ketones. The influence of the reaction pressure on the formation of by-products is, however, small when compared with that of the hydrogen/ketone mole ratio.

If, however, the conversion of the starting ketone and the yield of the main product in gram per catalyst volume per hour are taken into consideration, it is advantageous to carry out the reaction at higher temperatures within the above-specified temperature and pressure ranges while maintaining the starting ketone in liquid phase. The reaction temperature generally used in the present invention with good results is 100° C. to the critical temperature of the starting ketone, preferably 110° C. to 230° C. The reaction pressure used with good results ranges from 10 kg./cm.$^2$ to 60 kg./cm.$^2$, preferably from 15 kg./cm.$^2$ to 50 kg./cm.$^2$. At higher temperatures within the above-specified range, the conversion of the starting ketone and the selectivity of the main product, and hence the yield of the main product in gram per catalyst volume per hour, become better.

The mode of reaction and the reaction apparatus to be used in the present invention are not particularly restricted, and the known modes of reaction and reaction apparatus can be used without modification. That is to say, either the batchwise and continuous methods can be employed, and in the case of the continuous method either the fixed catalyst bed type, the fluidized catalyst bed type or the agitating type of the known modes of reaction and reaction apparatus that are employed in the hydrogenation reaction can be employed without modification.

KETONES

Thus, it is possible in accordance with the invention method to carry out:

(a) The dimeric condensation and saturation reaction between ketone molecules in which at least one hydrogen atom is attached to either one or both of the carbon atoms of the alpha position which are attached to the carbonyl group; and (b) The dimeric condensation and saturation reaction between a ketone molecule in which at least two hydrogen atoms are attached to either one or both of the foregoing carbon atoms of the alpha position and a ketone molecule having no hydrogen atom whatsoever attached to the carbon atoms of the alpha position.

As ketones belonging to (a) above, any of the ketones having the following formula will do, and those in which the sum total of the carbon atoms is 3–19 are conveniently used.

wherein $R_1$ is either alkyl, cycloalkyl, aryl, aralkyl, alkaryl or alkenyl, and $R_2$ and $R_3$, which may be the same or different, are each hydrogen, alkyl, cycloalkyl, aryl, aralkyl, alkaryl or alkenyl.

In the case of (b) above, the dimeric condensation and saturation reaction takes place between the ketones belonging to (a), above, but in which at least one of either $R_2$ and $R_3$ is a hydrogen atom and/or in which at least two hydrogen atoms are attached to the carbon atom of the alpha position in $R_1$ which is attached to the carbonyl group, such, for example, as diphenyl ketone and ditertiary butyl ketone.

According to the present invention, the dimerically condensed and saturated ketones (dimerized saturated ketones) can be produced with no restrictions whatsoever between the ketone molecules defined in (a) and (b) above, but for achieving the dimeric condensation and saturation between ketones of a single class, since a pluarlity of classes of products are formed when the reaction of a mixture of ketones of different classes is carried out, with the consequence that their separation becomes complicated.

Specific examples of these ketones, which are used in the invention method, include such as acetone, methyl ethyl ketone, diethylketone, methyl propyl ketone, methyl isobutyl ketone, ethyl hexyl ketone, dinonylketone, acetophenone, methyl cyclohexyl ketone, isopropyl-tert.-butyl ketone and isopropyl phenyl ketone. In Table I, below, are shown the typical products that result from the use of these ketones.

TABLE I

| | Starting ketone | Principal reaction product |
|---|---|---|
| 1 | Acetone | Methyl isobutyl ketone. |
| 2 | Methyl ethyl ketone | 3-methyl heptane-5-one. |
| 3 | Diethyl ketone | 3-ethyl-4-methyl heptane-5-one. |
| 4 | Methyl propyl ketone | 4-methyl nonane-6-one. |
| 5 | Methyl isobutyl ketone | 2, 6, 8-trimethyl nonane-4-one. |
| 6 | Ethyl hexyl ketone | 7-ethyl-8-methyl pentadecane-9-one. |
| 7 | Dinonyl ketone | 11-octyl-12-nonyheneicosane-10-one. |
| 8 | Acetophenone | β-Phenyl-propyl phenyl ketone. |
| 9 | Methyl cyclohexyl ketone | 2, 4-dicyclohexyl butane-4-one. |
| 10 | Isopropyl-tert-butyl ketone | 2, 2, 4, 4, 6, 6-hexamethyl-3-isopropyl heptane-5-one. |
| 11 | Isopropyl phenyl ketone | 2, 4, 4-trimethyl-3, 5-diphenylpentane-5-one. |
| 12 | {Acetone / Methyl ethyl ketone} | 2-methyl hexane-4-one. |
| 13 | {Acetone / Diphenyl ketone} | 1, 1-diphenyl butane-3-one. |
| 14 | {Acetone / Di-tert-butyl ketone} | 2, 2-dimethyl-3-isobutylhexane-5-one. |
| 15 | {Methyl isobutylketone / Diphenylketone} | 1, 1-diphenyl-5-methylhexane-3-one. |

For illustrating the present invention more specifically, the following examples are given. These examples are intended to be merely illustrative of the invention and not in limitation thereof. The determination of the product dimerized saturated ketones was carried out by means of gas chromatography. On the other hand, the palladium content of the catalyst was determined by means of fluorescent X-ray analysis.

Of the examples given, Examples 1–8 are for illustrating the various methods of preparing the invention catalyst, using the ion-exchange technique.

EXAMPLE 1

The various water-soluble metal salts indicated under Nos. 1–13 of Table II were dissolved in water, followed by dissolving by heating therein the various water-soluble palladium salts as indicated under Nos. 1–13 of said table. Separately, the phosphoric acid components indicated in Table II were dissolved in water. Next the former solution was added gradually to latter solution at room temperature with stirring, after which ammonia water (concentrated ammonia water unless otherwise specified) was added until the pH values indicated in Table II were attained. This was followed by continuous stirring of the solution for 4 hours and thereafter allowing it to stand still for 24 hours. The resulting precipitate was separated by filtration, water-washed and, after removal of the residual, unreacted portion of the foregoing salts, dried at 110° C. to obtain the gel-like metal phosphates indicated in Table II, which were partially substituted with palladium cations. The so obtained gel-like products were pulverized to 8–12 and 16–24 mesh size JIS Z8801, after which they were calcined in a stream of hydrogen at 400° C. for 8 hours to obtain the intended catalysts.

In the case of experiments No. 1 and No. 3 in Table II, ammonia water in amounts of respectively 7.2 and 90 ml. was added for adjusting the pH. On the other hand, in the case of experiment No. 2, 60 ml. of the pH adjusting ammonia water was added immediately after diluting the phosphoric acid with water and thereafter mixed with aqueous zirconium oxychloride solution to prepare the catalyst.

EXAMPLE 2

After dissolving 97 grams of zirconium oxychloride $$(ZrOCl_2 \cdot 8H_2O)$$

in 6 liters of water, 0.71 grams of palladium chloride was added therein and dissolved by heating. On the other hand, 70 grams of phosphoric acid was diluted with 6 liters of water. The former solution was then added to the latter solution with stirring at room temperature, after which the pH of the reaction solution was adjusted to 5.0 by adding 40% aqueous methylamine solution while continuing the stirring. The mole ratio $PO_4^{-3}/Zr$ was 2.0 at this time. Thereafter the stirring was continued for another 4 hours, after which the reaction solution was allowed to stand for 24 hours. The resulting precipitate was then separated by filtration, washed with water and dried at 110° C. This was followed by pulverizing the so obtained precipitate to a particle size of 8–12 and 16–24 mesh (JIS) and calcining at 300° C. for 3 hours in air. Thereafter, the calcined product was further submitted to a reducing treatment in a stream of hydrogen for 6 hours at 400° C. to obtain a zirconium phosphate catalyst whose palladium content was 0.5% by weight.

EXAMPLE 3

Dried gel obtained by operating the reaction under identical conditions as in experiment No. 2 of Example 1 was pulverized to a particle size of 8–12 and 16–24 mesh and then submitted to a reducing treatment for 4 hours at 100° C. using formaldehyde vapor. The gel was then impregnated with 0.1N HCl for 24 hours at room temperature to remove the ammonium ions, followed by water-washing until the chlorine ions disappeared and thereafter dried at 110° C. to obtain a zirconium phosphate catalyst of a palladium content of 0.5% by weight.

EXAMPLE 4

(1) Thirty-five grams of phosphoric acid was diluted with 3 liters of water. On the other hand, 97 grams of zirconium oxychloride was dissolved in 3 liters of water. The two solutions were then reacted with stirring by being introduced dropwise to a reaction tank maintained at a temperature of 40° C. over a period of about 3 hours at a constant rate, using a constant quantity delivery pump. The pH of the reaction solution was 1.0 and the mole ratio $PO_4^{-3}/Zr$ was 1 in this case. The resulting precipitate, after being allowed to stand for about 24 hours, was repeatedly washed with water until its pH became 3. The precipitate was then separated by filtration and dried at 110° C. to obtain a product which was zirconium phosphate.

(2) After pulverizing the foregoing zirconium phosphate to a particle size of 8–12 and 16–24 mesh, 15 ml. thereof was packed in a glass column, after which one liter of 0.1N ammonia water containing 2 grams of palladium chloride was passed through the glass column to carry out the ion exchange reaction. Next, the ion-exchanged zirconium phosphate was thoroughly washed with water and, after being predried at 110° C., was reduced in a stream of hydrogen for 8 hours at 400° C. while discharging ammonia gas to thereby yield zirconium phosphate whose content of palladium was 2.0% by weight.

EXAMPLE 5

23.2 grams of sodium hydroxide was dissolved in 3 liters of water, to which was then added 48.0 grams of phosphoric acid, after which was also added with vigorous stirring 64.4 grams of zirconium oxychloride in solution in

TABLE II

| Number | Metal salt used Class | Amount added (g.) | Phosphoric acid component Class | Dissolving water (l.) | Amount added (g.) | Palladium salt Class | Dissolving water (l.) | Amount added (g.) | pH adjusting compound | Ml. | Mole ratio $PO_4^{-3}/Me$ | pH of reaction solution | Resulting catalyst Class | Pd content (wt. percent) |
|---|---|---|---|---|---|---|---|---|---|---|---|---|---|---|
| 1 | $ZrOCl_2 \cdot 8H_2O$ | 97 | $H_3PO_4$ | 6 | 70 | $PdCl_2$ | 6 | 0.71 | $NH_4OH$ | 72 | 2.1 | 5.0 | Zirconium phosphate | 0.5 |
| 2 | Same as above | 97 | Same as above | 6 | 35 | Same as above | 6 | 0.50 | Same as above | 60 | 1.0 | 4.8 | do | 0.5 |
| 3 | do | 97 | do | 2 | 70 | do | 2 | 0.71 | do | 90 | 2.0 | 7.6 | do | 0.5 |
| 4 | do | 97 | do | 2 | 70 | do | 2 | 1.4 | do | 90 | 2.0 | 4.0 | do | 0.5 |
| 5 | do | 97 | $NaH_2PO_4 \cdot 2H_2O$ | 2 | 58 | do | 6 | 0.50 | $1N-NH_4OH$ | | 2.0 | 5.0 | do | 0.5 |
| 6 | do | 97 | $H_3PO_4$ | 6 | 70 | do | 6 | 0.92 | $NH_4OH$ | | 2.0 | 5.0 | do | 0.5 |
| 7 | do | 97 | Same as above | 6 | 70 | $Pd(NO_3)_2$ | 6 | 0.96 | Same as above | | 2.0 | 5.0 | do | 0.5 |
| 8 | do | 97 | do | 6 | 70 | $PdSO_4 \cdot 2H_2O$ | 6 | 0.28 | do | | 2.0 | 5.0 | do | 0.2 |
| 9 | do | 97 | do | 6 | 70 | $PdCl_2$ | 6 | 1.42 | do | | 2.0 | 5.0 | do | 1.0 |
| 10 | do | 97 | do | 6 | 70 | Same as above | 5 | 2.15 | do | | 2.0 | 5.0 | do | 0.8 |
| 11 | $TiCl_4$ | 57 | do | 5 | 57 | do | 3 | 0.80 | $1N-NH_4OH$ | | 2.0 | 5.0 | Titanium phosphate | 0.4 |
| 12 | $HfOCl_2 \cdot 8H_2O$ | 41 | do | 3 | 24 | do | 3 | 0.3 | do | | 2.0 | 5.0 | Hafnium phosphate | 0.4 |
| 13 | $SnCl_4 \cdot 5H_2O$ | 100 | $NaH_2PO_4 \cdot 2H_2O$ | 6 | 112 | do | 6 | 0.8 | Same as above | | 2.0 | 5.0 | Stannic phosphate | 0.5 |

3 liters of water. The pH of the aqueous solution was 3.8 at this time and the mole ratio $PO_4^{-3}/Zr$ was 2.0. The resulting gel-like precipitate, after being allowed to stand for about 24 hours, was separated by filtration, water-washed at 110° C., and dried. The dried precipitate was then treated with 0.1N HCl and, after being water-washed to remove the chlorine ions, was dried at 110° C. followed by pulverizing the resulting gel-like product to 200–300 mesh. Separately, 0.45 grams of palladium chloride was dissolved in 10 ml. of 28% ammonia water followed by dilution with 200 ml. of water. Fifty grams of the dried gel-like product obtained hereinabove was then immersed in this solution and allowed to stand for 24 hours at room temperature. This was followed by operating as in Example 4 to obtain zirconium phosphate containing 0.5% by weight of palladium.

EXAMPLE 6

Fifty-seven grams of titanium tetrachloride was dissolved in 100 ml. of 35% HCl solution and then dilute with 5 liters of water. On the other hand, 70 grams of phosphoric acid was diluted with 5 liters of water. The two solutions were then mixed at room temperature with stirring, after which the pH of the reaction solution was adjusted to 5.0 by slowly adding 28% ammonia water. After continuing the stirring for a further 4 hours, the solution was allowed to stand for 24 hours. The mole ratio $PO_4^{-3}/Ti$ at this time was 2.0. Thereafter, by operating as in Example 5, a titanium phosphate catalyst of a palladium content of 0.5% by weight was obtained.

EXAMPLE 7

Twenty-four grams of phosphoric acid and 12 grams of caustic soda were dissolved in 500 ml. of water. Separately, 41 grams of hafnium oxychloride was dissolved in 500 ml. of water. The latter solution was then mixed and reacted with the former solution at room temperature. The pH of the reaction solution was 5.0 and the mole $PO_4^{-3}/Hf$ was 2.0 at this time. This was followed by operating as in Example 5 to obtain a hafnium phosphate catalyst of a palladium content of 0.5% by weight.

EXAMPLE 8

210 grams of stannic chloride was dissolved in 600 ml. of water. Separately, 187 grams of sodium dihydrogen phosphate was dissolved in 1.2 liters of 1.2N caustic soda solution. The former solution was then added rapidly to the latter solution at room temperature with stirring. The resulting percipitate was separated by filtration and water-washed until its pH became 3.2. The pH of the reaction solution at the time of the preparation of the catalyst was 2.0 and the mole ratio $PO_4^{-3}/Sn$ was about 2. Thereafter, by operating as in Example 5, stannic phosphate of a palladium content of 0.5% by weight was obtained.

EXAMPLE 9

Dimerization and saturation reaction of acetone

The catalysts (8–16 mesh) obtained in Examples 1–8 were used and methyl isobutyl ketone (hereinafter abbreviated to MIBK) was prepared from acetone. Fifteen ml. (about 15 grams) each of the catalysts indicated in Table III were packed in the middle part of a stainless steel reaction tube 35 cm. in length and 20 mm. in diameter. When the reaction of the acetone was carried out in the presence of hydrogen under the reaction conditions indicated in Table III, the results obtained were as shown therein. The pressure in all cases was the gauge pressure (kg./cm.²) measured at the outlet end of the reaction tube. The abbreviations used in Table III and hereinafter, aside from MIBK, were IPA and DIPK, which denote isopropanol and diisobutyl ketone, respectively.

TABLE III

| Number | Catalyst used: Class | Pd content (wt. percent) | Example number | Amount of ketone passed (ml./hr.) | Amount of hydrogen (l./hr.) | Temperature (°C.) | Pressure (kg./cm.²) | Conversion (percent) | Product: Class | Product: Selectivity (wt. percent) | By-product: Class | By-product: Selectivity (wt. percent) | Space time yield of product (g./l. hr.) |
|---|---|---|---|---|---|---|---|---|---|---|---|---|---|
| 1 | Zirconium phosphate | 0.5 | 1 (No. 1) | 60 | 3 | 110 | 5.5 | 15.3 | MIBK | 96.2 | — | 0.6 | 406 |
| 2 | do | 0.5 | 1 (No. 2) | 60 | 4 | 108 | 5.6 | 15.6 | MIBK | 95.8 | — | 1.0 | 410 |
| 3 | do | 0.5 | 1 (No. 3) | 30 | 6 | 120 | 5.6 | 18.7 | MIBK | 74.8 | IPA | 24.0 | 193 |
| 4 | do | 0.5 | 1 (No. 4) | 30 | 5 | 120 | 6.1 | 23.6 | MIBK | 65.2 | IPA | 28.0 | 212 |
| 5 | do | 0.5 | 2 (No. 5) | 60 | 3 | 110 | 5.5 | 14.0 | MIBK | 95.0 | IPA | — | 369 |
| 6 | do | 0.5 | 1 (No. 6) | 60 | 4 | 108 | 5.5 | 13.4 | MIBK | 96.4 | — | — | 351 |
| 7 | do | 0.5 | 1 (No. 7) | 60 | 3 | 110 | 5.5 | 15.0 | MIBK | 95.5 | — | — | 399 |
| 8 | do | 0.2 | 1 (No. 8) | 60 | 4 | 110 | 6.2 | 14.6 | MIBK | 96.4 | — | — | 385 |
| 9 | do | 1.0 | 1 (No. 9) | 60 | 4 | 110 | 6.2 | 16.1 | MIBK | 88.1 | IPA | 2.6 | 306 |
| 10 | do | 1.5 | 1 (No. 10) | 60 | 4 | 112 | 6.1 | 17.8 | MIBK | 92.3 | IPA | 5.1 | 453 |
| 11 | do | 0.5 | 3 (No. 11) | 60 | 4 | 112 | 6.1 | 17.0 | MIBK | 91.1 | IPA | 6.5 | 427 |
| 12 | do | 0.4 | 1 (No. 12) | 60 | 3 | 108 | 6.1 | 12.0 | MIBK | 92.7 | — | — | 307 |
| 13 | do | 0.4 | 1 (No. 13) | 60 | 3 | 120 | 6.1 | 18.0 | MIBK | 91.0 | IPA | 1.6 | 226 |
| 14 | Titanium phosphate | 2.0 | 4 | 60 | 3 | 120 | 6.1 | 14.0 | MIBK | 94.3 | DIBK | — | 182 |
| 15 | Hafnium phosphate | 0.5 | 5 | 60 | 3 | 108 | 5.5 | 6.5 | MIBK | 93.0 | DIBK | 5.6 | 83 |
| 16 | Stannic phosphate | 0.5 | 6 | 60 | 3 | 110 | 5.5 | 10.6 | MIBK | 91.0 | DIBK | — | 266 |
| 17 | Zirconium phosphate | 0.5 | 4 | 60 | 3 | 110 | 5.5 | 12.6 | MIBK | 95.7 | DIBK | 3.4 | 333 |
| 18 | do | 0.5 | 5 | 60 | 3 | 110 | 5.5 | 11.4 | MIBK | 93.5 | — | — | 294 |
| 19 | Hafnium phosphate | 0.5 | 7 | 60 | 3 | 110 | 5.5 | 10.0 | MIBK | 94.0 | — | 5.3 | 295 |
| 20 | Stannic phosphate | 0.5 | 8 | 60 | 3 | 110 | 5.5 | 5.3 | MIBK | 93.0 | — | — | 136 |

EXAMPLE 10

Dimerization and saturation reaction of acetone

MIBK was prepared from acetone using 15 ml. of each of the catalysts (16–24 mesh) obtained in Examples 1–8, employing a stainless steel apparatus having a length of 500 mm. and an inner diameter of 10 mm. The reaction conditions in all cases were set as follows:

| | |
|---|---|
| Amount of acetone passed _____ milliters/hour __ | 60 |
| Amount of hydrogen passed _____ liters/hour | 7 |
| Reaction temperature _____ °C __ | 130 |
| Reaction pressure _____ kg./cm.$^2$ __ | 200 |

The results obtained were as shown in Table IV.

EXAMPLE 11

Dimerization and saturation reaction of acetone

MIBK was prepared from acetone using 15 ml. of the zirconium phosphate catalyst (8–16 mesh) of palladium content 0.5% by weight obtained in experiment No. 1 of Example 1, employing the same apparatus as in Example 9 and varying the reaction temperature and pressure and the amounts fed of acetone and hydrogen as indicated in Table V. The results obtained are shown in Table V.

EXAMPLE 12

Dimerization and saturation reaction of acetone

MIBK was prepared from acetone using 15 ml. of the zirconium phosphate catalyst (16–24 mesh) having a palladium content of 0.5% by weight obtained by operating as in Experiment No. 2 of Example 1, except that the pH of the reaction solution was adjusted to 5.0. The catalyst was packed in the middle part of a stainless steel reaction tube 500 mm. in length and 10 mm. in diameter. The foregoing operation was effected at varying reaction temperatures and pressures and varying amounts fed of acetone and hydrogen as indicated in Table VI. The results obtained are also shown in Table VI. The abbreviations used in Table VI represent the following meaning.

LHSV of acetone: Liquid volume/catalyst volume/hour of acetone

STY OF MIBK: The yield of MIBK in gram per liter of the catalyst per hour.

TABLE IV

| | Catalysts used | | | Results | | | | |
|---|---|---|---|---|---|---|---|---|
| | | | | | Selectivity (percent) | | | Space time yield of MIBK (g./l. cat./hr.) |
| Number | Class | Palladium content (wt. percent) | Example number | Conversion (percent) | MIBK | IPA | DIBK | |
| 1 | Zirconium phosphate | 0.5 | 1 (No. 1) | 32.0 | 94.4 | 1.8 | 3.8 | 834 |
| 2 | do | 0.5 | 1 (No. 2) | 34.6 | 93.5 | 1.8 | 4.7 | 893 |
| 3 | do | 0.5 | 1 (No. 3) | 41.7 | 74.8 | 24.0 | 1.6 | 861 |
| 4 | do | 0.5 | 1 (No. 4) | 43.2 | 65.2 | 28.0 | 6.8 | 777 |
| 5 | do | 0.5 | 2 | 31.2 | 93.0 | 1.9 | 5.1 | 801 |
| 6 | do | 0.5 | 1 (No. 5) | 36.5 | 85.1 | 10.4 | 4.5 | 857 |
| 7 | do | 0.5 | 1 (No. 6) | 34.1 | 93.8 | 1.8 | 4.4 | 883 |
| 8 | do | 0.5 | 1 (No. 7) | 34.4 | 93.0 | 1.8 | 5.2 | 883 |
| 9 | do | 0.2 | 1 (No. 8) | 27.6 | 89.7 | 1.6 | 8.7 | 683 |
| 10 | do | 1.0 | 1 (No. 9) | 34.0 | 93.2 | 2.0 | 4.0 | 875 |
| 11 | do | 1.5 | 1 (No. 10) | 33.6 | 93.2 | 3.1 | 4.7 | 864 |
| 12 | do | 0.5 | 3 | 26.6 | 92.7 | 2.6 | 4.7 | 681 |
| 13 | Titanium phosphate | 0.8 | 1 (No. 11) | 34.1 | 91.0 | 1.6 | 5.6 | 857 |
| 14 | Hafnium phosphate | 0.4 | 1 (No. 12) | 25.8 | 94.3 | 1.4 | 4.3 | 672 |
| 15 | Stannic phosphate | 0.5 | 1 (No. 13) | 12.0 | 93.0 | 1.0 | 6.0 | 308 |
| 16 | Zirconium phosphate | 2.0 | 4 | 23.5 | 94.1 | 1.7 | 4.2 | 610 |
| 17 | do | 0.5 | 5 | 28.0 | 94.0 | 1.8 | 4.2 | 726 |
| 18 | Titanium phosphate | 0.5 | 6 | 25.3 | 93.5 | 1.6 | 4.9 | 653 |
| 19 | Hafnium phosphate | 0.5 | 7 | 22.2 | 94.0 | 1.8 | 4.2 | 576 |
| 20 | Stannic phosphate | 0.5 | 8 | 11.5 | 93.0 | 1.7 | 5.3 | 295 |

TABLE V

| No. | Temperature (°C.) | Pressure (gauge) (kg./cm.$^2$) | Acetone (ml./hr.) | H$_2$ (l./hr.) | Conversion (percent) | Selectivity (percent) | | | Space time yield of MIBK (g./l. hr.) |
|---|---|---|---|---|---|---|---|---|---|
| | | | | | | MIBK | IPA | DIBK | |
| 1 | 120 | 5.5 | 60 | 3 | 23.1 | 91 | 1.9 | 6.1 | 570 |
| 2 | 112 | 5.5 | 60 | 3 | 16.3 | 93 | 1.2 | 5.4 | 410 |
| 3 | 102 | 5.5 | 60 | 3 | 14.3 | 97 | 0.5 | 2.5 | 380 |
| 4 | 114 | 5.6 | 60 | 4 | 18.3 | 91.0 | 1.2 | 5.9 | 470 |
| 5 | 114 | 5.6 | 75 | 5 | 15.3 | 93.4 | 0.8 | 6.5 | 480 |
| 6 | 114 | 5.6 | 105 | 7 | 12.7 | 96.1 | 0.5 | 5.8 | 580 |
| 7 | 102 | 8.8 | 60 | 5 | 14.8 | 92.1 | 5.7 | 2.2 | 370 |
| 8 | 102 | 7.6 | 60 | 5 | 15.1 | 94.3 | 4.0 | 1.7 | 390 |
| 9 | 102 | 5.7 | 60 | 5 | 14.7 | 94.7 | 2.8 | 2.4 | 380 |
| 10 | 102 | 2.8 | 60 | 5 | 16.0 | 92.3 | 1.6 | 6.1 | 400 |
| 11 | 120 | 6.7 | 60 | 3 | 18.1 | 94.6 | 0.6 | 4.1 | 470 |
| 12 | 120 | 6.7 | 60 | 6 | 19.2 | 92.6 | 1.0 | 4.9 | 480 |
| 13 | 120 | 6.7 | 60 | 8 | 22.4 | 86.2 | 5.5 | 6.8 | 480 |
| 14 | 120 | 6.7 | 60 | 10 | 25.2 | 82.1 | 9.3 | 8.0 | 560 |

TABLE VI

| Number | Reaction conditions | | | | Results | | | | |
|---|---|---|---|---|---|---|---|---|---|
| | Temperature (°C.) | Pressure (gauge) (kg./cm.²) | LHSV of acetone (hr.⁻¹) | Hydrogen acetone (mol ratio) | Conversion (percent) | Selectivity (percent) | | | S.T.Y. of MIBK (g./l.cat./hr.) |
| | | | | | | MIBK | IPA | DIBK | |
| 1 | 120 | 15.5 | 4.0 | 0.34 | 27.6 | 95.1 | 2.1 | 2.8 | 724 |
| 2 | 122 | 20.0 | 4.0 | 0.30 | 27.9 | 95.9 | 1.7 | 2.4 | 738 |
| 3 | 120 | 25.5 | 4.0 | 0.25 | 28.3 | 94.1 | 2.8 | 3.1 | 735 |
| 4 | 210 | 40.0 | 4.0 | 0.30 | 29.5 | 92.4 | 4.6 | 3.0 | 751 |
| 5 | 120 | 50.0 | 4.0 | 0.30 | 30.4 | 91.1 | 6.1 | 2.8 | 765 |
| 6 | 100 | 20.0 | 4.0 | 0.30 | 18.6 | 97.0 | 1.9 | 1.1 | 497 |
| 7 | 110 | 20.0 | 4.0 | 0.30 | 22.6 | 96.9 | 1.9 | 1.2 | 604 |
| 8 | 130 | 20.0 | 4.0 | 0.30 | 34.6 | 93.5 | 1.8 | 4.7 | 893 |
| 9 | 140 | 20.0 | 4.0 | 0.30 | 42.2 | 90.7 | 1.8 | 7.5 | 1,056 |
| 10 | 150 | 20.0 | 4.0 | 0.30 | 51.0 | 87.0 | 2.0 | 11.0 | 1,440 |
| 11 | 130 | 20.0 | 2.0 | 0.31 | 40.6 | 91.0 | 2.2 | 6.5 | 510 |
| 12 | 130 | 20.0 | 10.0 | 0.31 | 25.6 | 95.1 | 1.6 | 1.3 | 1,678 |
| 13 | 130 | 20.0 | 15.0 | 0.31 | 23.5 | 95.6 | 0.9 | 0.8 | 2,357 |
| 14 | 130 | 20.0 | 20.0 | 0.30 | 18.4 | 96.2 | 0.6 | 1.4 | 2,442 |
| 15 | 140 | 20.0 | 10.0 | 0.32 | 33.4 | 91.2 | 1.8 | 0.9 | 2,098 |
| 16 | 140 | 20.0 | 14.3 | 0.30 | 28.9 | 93.4 | 1.5 | 0.7 | 2,659 |
| 17 | 140 | 20.0 | 20.0 | 0.32 | 25.3 | 94.8 | 1.2 | 1.2 | 3,309 |
| 18 | 160 | 40.0 | 10.0 | 0.60 | 38.4 | 92.8 | 1.4 | 0.2 | 2,459 |
| 19 | 180 | 50.0 | 14.3 | 0.82 | 53.1 | 87.2 | 1.8 | 0.3 | 4,569 |
| 20 | 200 | 50.0 | 14.3 | 0.83 | 66.5 | 83.7 | 1.9 | 0.2 | 5,492 |

EXAMPLE 13

Dimerization and saturation reaction of varied ketones

Fifteen ml. each of the catalysts obtained in experiments numbers 1, 11, 12, and 13 of Example 1 were packed in the middle part of a reaction tube identical to that used in Example 9 and the reactions between the varied classes of ketones and hydrogen were carried out with the results shown in Table VII. The abbreviations used in Table VII represent the following compounds:

MEK: methyl ethyl ketone
DEK: diethylketone
MIBK: methyl isobutylketone
DNK: dinonylketone
MCK: methyl cyclohexylketone
APH: acetophenone
MHO: 3-methyl heptane-5-one
EMHO: 3-ethyl-4-methyl heptane-5-one
TMNO: 2,6,8-trimethyl nonane-4-one
ONHO: 11,-octyl-12-nonylheneicosane-10-one
DCHB: 2,4-dicyclo hexyl butane-4-one
PPPK: β-phenyl-propyl phenyl ketone

TABLE VII

| Number | Ketones | Catalyst used | | Reaction conditions | | | | Results | | |
|---|---|---|---|---|---|---|---|---|---|---|
| | | Class | Experiment No. | Temp. (°C.) | Pressure (kg./cm.²) | LHSV (hr.⁻¹) | H₂/ketone (mol ratio) | Conversion (percent) | Product Name | Selectivity (mol percent) |
| 1 | MEK | Zirconium phosphate | 1 | 145 | 6.8 | 2.0 | 0.2 | 10.2 | MHO | 94.2 |
| 2 | MEK | Titanium phosphate | 11 | 145 | 6.8 | 2.0 | 0.2 | 10.0 | MHO | 95.0 |
| 3 | MEK | Hafnium phosphate | 12 | 145 | 6.8 | 2.0 | 0.2 | 7.7 | MHO | 94.0 |
| 4 | MEK | Stannic phosphate | 13 | 145 | 6.8 | 2.0 | 0.2 | 3.5 | MHO | 94.4 |
| 5 | DEK | Zirconium phosphate | 1 | 105 | 2.0 | 4.0 | 0.2 | 6.3 | EMHO | 96.5 |
| 6 | DEK | Titanium phosphate | 11 | 105 | 2.0 | 4.0 | 0.2 | 5.5 | EMHO | 96.0 |
| 7 | MIBK | Zirconium phosphate | 1 | 202 | 1.0 | 0.425 | 1.1 | 42.0 | TMNO | 82.2 |
| 8 | MIBK | Titanium phosphate | 11 | 202 | 1.0 | 0.425 | 1.1 | 38.5 | TMNO | 84.0 |
| 9 | DNK | Zirconium phosphate | 1 | 130 | 1.0 | 2.0 | 0.4 | 6.3 | ONHO | 85.3 |
| 10 | DNK | Titanium phosphate | 11 | 130 | 1.0 | 2.0 | 0.4 | 5.9 | ONHO | 83.5 |
| 11 | DNK | Hafnium phosphate | 12 | 130 | 1.0 | 2.0 | 0.4 | 4.0 | ONHO | 86.0 |
| 12 | DNK | Stannic phosphate | 13 | 130 | 1.0 | 2.0 | 0.4 | 1.8 | ONHO | 82.1 |
| 13 | MCK | Zirconium phosphate | 1 | 130 | 1.0 | 2.0 | 0.2 | 6.5 | DCHB | 82.0 |
| 14 | MCK | Titanium phosphate | 11 | 130 | 1.0 | 2.0 | 0.2 | 6.0 | DCHB | 80.0 |
| 15 | APH | Zirconium phosphate | 1 | 200 | 1.0 | 1.0 | 0.2 | 4.7 | PPPK | 79.2 |
| 16 | APH | Titanium phosphate | 11 | 200 | 1.0 | 1.0 | 0.2 | 4.3 | PPPK | 77.4 |
| 17 | APH | Hafnium phosphate | 12 | 200 | 1.0 | 1.0 | 0.2 | 3.8 | PPPK | 78.0 |
| 18 | APH | Stannic phosphate | 13 | 200 | 1.0 | 1.0 | 0.2 | 1.5 | PPPK | 71.2 |

EXAMPLE 14

Dimerization and saturation reaction of varied ketones

Fifteen ml. each of the several catalysts obtained in Examples 5–8 were used, and the reactions between the various classes of ketones and hydrogen were carried out by packing these catalysts in the middle part of a reaction tube identical to that used in Example 9 with the results shown in Table VIII. The abbreviations in this table were the same as those of Example 13.

TABLE VIII

| Number | Ketones | Catalyst used | | Reaction conditions | | | | Results | | |
|---|---|---|---|---|---|---|---|---|---|---|
| | | Class | Experiment No. | Temp. (°C.) | Pressure (kg./cm.²) | LHSV (hr.⁻¹) | H₂/ketone (mol ratio) | Conversion (percent) | Product Name | Selectivity (mol percent) |
| 1 | MEK | Zirconium phosphate | 5 | 145 | 6.8 | 2.0 | 0.2 | 9.1 | MHO | 94.0 |
| 2 | MEK | Titanium phosphate | 6 | 145 | 6.8 | 2.0 | 0.2 | 8.5 | MHO | 94.5 |
| 3 | MEK | Hafnium phosphate | 7 | 145 | 6.8 | 2.0 | 0.2 | 7.0 | MHO | 94.0 |
| 4 | MEK | Stannic phosphate | 8 | 145 | 6.8 | 2.0 | 0.2 | 3.0 | MHO | 93.0 |
| 5 | DEK | Zirconium phosphate | 5 | 105 | 2.0 | 4.0 | 0.2 | 6.0 | EMHO | 96.0 |
| 6 | MIBK | Titanium phosphate | 6 | 105 | 2.0 | 4.0 | 0.2 | 5.2 | EMHO | 96.0 |
| 7 | MIBK | Zirconium phosphate | 5 | 200 | 1.0 | 0.425 | 1.1 | 35.6 | TMNO | 81.1 |
| 8 | MIBK | Titanium phosphate | 6 | 200 | 1.0 | 0.425 | 1.1 | 31.4 | TMNO | 85.4 |
| 9 | DNK | Zirconium phosphate | 5 | 130 | 1.0 | 2.0 | 0.4 | 5.0 | ONHO | 84.0 |
| 10 | DNK | Titanium phosphate | 6 | 130 | 1.0 | 2.0 | 0.4 | 5.0 | ONHO | 83.0 |
| 11 | DNK | Hafnium phosphate | 7 | 130 | 1.0 | 2.0 | 0.4 | 3.7 | ONHO | 83.0 |
| 12 | DNK | Stannic phosphate | 8 | 130 | 1.0 | 2.0 | 0.4 | 1.4 | ONHO | 81.0 |
| 13 | MCK | Zirconium phosphate | 5 | 130 | 1.0 | 2.0 | 0.2 | 5.3 | DCHB | 82.0 |
| 14 | MCK | Titanium phosphate | 6 | 130 | 1.0 | 2.0 | 0.2 | 5.0 | DCHB | 80.0 |
| 15 | APH | Zirconium phosphate | 5 | 200 | 1.0 | 1.0 | 0.2 | 4.0 | PPPK | 78.0 |
| 16 | APH | Titanium phosphate | 6 | 200 | 1.0 | 1.0 | 0.2 | 4.0 | PPPK | 75.00 |
| 17 | APH | Hafnium phosphate | 7 | 200 | 1.0 | 1.0 | 0.2 | 3.5 | PPPK | 76.00 |
| 18 | APH | Stannic phosphate | 8 | 200 | 1.0 | 1.0 | 0.2 | 1.0 | PPPK | 73.00 |

EXAMPLE 15

Dimerization and saturation reaction of acetone and methyl ethyl ketone

Four ml. of the catalyst obtained in experiment No. 1 of Example 1 were packed in the middle part of a Pyrex reaction tube 40 cm. in length and 12 mm. in diameter, after which a mixture of acetone and methyl ethyl ketone in a mole ratio of 1:1 and hydrogen were introduced at the rates respectively of 1.7 ml./hr. and 5.8 ml./hr. under the conditions of atmospheric pressure and a reaction temperature of 175° C. As a result, the composition of the reaction product was: acetone 20.4 mol percent, methyl ethyl ketone 29.9 mol percent, methyl isobutyl ketone 10.2 mol percent, 2-methyl hexane-4-one 9.7 mol percent, 3-methyl hexane-5-one 5.0 mol percent, 3-methyl heptane-5-one 3.1 mol percent, diisobutyl ketone 9.4 mol percent, 2-methyl-4-ethyl heptane-6-one 6.6 mol percent, 2,6,8-trimethyl nonanone 2.2 mol percent, and remainder 3.5%.

EXAMPLE 16

Dimerization and saturation reaction of acetone and diphenyl ketone

An externally heated 300-ml. autoclave was charged with 100 grams of 9:1 mole ratio diphenylketoneacetone mixture and 10 grams of the zirconium phosphate catalyst containing 0.5% by weight of palladium, as obtained in experiment No. 1 of Example 1. After introducing hydrogen to a gauge pressure of 5.0 kg./cm.$^2$ at room temperature, the reaction was carried out for 2 hours at 150° C. at a maximum pressure of 21 kg./cm.$^2$. The composition of the product in mol percent was as follows: unreacted diphenylketone 93%, unreacted acetone 2%, methyl isobutyl ketone 3%, and 1,1-diphenyl butane-3-one 2%.

EXAMPLE 17

Dimerization and saturation reaction of acetone

Fifteen grams of the zirconium phosphate prepared by the procedure described in Example 4, paragraph (1) and pulverized to 8-12 mesh was immersed in 50 ml. of 1N HCl in which had been dissolved 0.17 grams of palladium chloride. After allowing the zirconium phosphate to stand for 24 hours in this satte, it was subjected to drying under reduced pressure at 100° C., followed by a reducing treatment in a stream of hydrogen for 8 hours at 400° C. to thereby yield a zirconium phosphate catalyst whose palladium content was 0.7% by weight. Fifteen ml. of this catalyst was packed in a reaction tube identical to that used in Example 10, and the reaction was carried out by introducing acetone and hydrogen at the rates respectively of 60 ml./hr. and 4 liter/hr. under the conditions of temperature 120° C. and pressure 6.2 kg./cm.$^2$. As a result, the conversion was 21.6%, and the yields on a weight basis were: MIBK 88.6%, IPA 5.3%, DIBK 2.0%, and mesityl oxide 3.2%.

EXAMPLE 18

Dimerization and saturation reaction of acetone

Eight grams of commercial palladium (containing 2.5 weight percent of palladium in active carbon) was added to 30 grams of the zirconium phosphate obtained as described in paragraph (1) of Example 4 and mixed for about 15 hours with a kneader. Thereafter, this mixture was compression molded into pellets having a diameter of 5 mm. and a height of 3 mm. The pellets were pulverized to a size of 8-12 mesh (JIS) and thereafter subjected to a hydrogen treatment for 8 hours at a temperature of 400° C. Fifteen ml. of the so-obtained catalyst was packed in a reaction tube, and the reaction was carried out as in Example 17 by introducing acetone and hydrogen at the rates respectively of 60 ml./hr. and 4 liter/hr. under the conditions of temperature 120° C. and pressure 6.2 kg./cm. As a result, the conversion of acetone was 15.8% and the yields were MIBK 85.5 wt. percent, IPA 7.0 wt. percent, DIBK 1.8 wt. percent, and mesityl oxide 4.5 wt. percent.

EXAMPLE 19

Dimerization and saturation reaction of acetone

After adding 0.3 grams of commercial palladium black powder to 30 grams of the zirconium phosphate obtained as described in paragraph (1) of Example 4 and mixing the two components for about 15 hours with a kneader, the mixture was compression molded into pellets having a diameter of 5 mm. and a height of 3 mm. The pellets were pulverized to a size of 8-12 mesh (JIS) and thereafter subjected to a hydrogen treatment for 8 hours at a temperature of 400° C. Fifteen ml. of the so-obtained mixed catalyst was packed in a reaction tube and acetone and hydrogen were reacted under identical conditions as in Example 17 with the result that the conversion of acetone was 13.4% and the yields of MIBK, IPA, DIBK and mesityl oxide (MO) were 81.5 wt. percent, 7.5 wt. percent, 2.9 wt. percent, and 8.0 wt. percent, respectively.

EXAMPLE 20

Dimerization and saturation reaction of acetone

Eight grams of commercial palladium catalyst (containing 2.5 wt. percent of palladium in active carbon) was added to 30 grams of the zirconium phosphate obtained in Example 6 and the two components were mixed for about 15 hours with a kneader. The mixture was then compression molded into pellets having a diameter of 5 mm. and a height of 3 mm. The pellets were pulverized to a size of 8-12 mesh (JIS) and subjected to a hydrogen treatment for 8 hours at a temperature of 400° C. Fifteen ml. of the so-obtained mixed catalyst was packed in a reaction tube, and the reaction of acetone and hydrogen was carried out under identical conditions as in Example 17 with the result that the conversion of acetone was 13.5% and the yields of MIBK, IPA, DIBK, and mesityl oxide were, respectively, 86.0 wt. percent, 6.3 wt. percent, 2.0 wt. percent, and 5.7 wt. percent.

EXAMPLE 21

Dimerization and saturation reaction of varied ketones

Fifteen ml. each of the catalysts obtained in Examples 18 and 20 were packed in the same reaction tube as used in Example 9 and the reactions of various classes of ketones and hydrogen were carried out with the results shown in Table IX. The abbreviations used in Table IX are identical to those used in Example 13.

TABLE IX

| | Catalyst used | | | Reaction conditions | | | | Results | | |
|---|---|---|---|---|---|---|---|---|---|---|
| | | | | | | | | | Product | |
| Number | Ketones | Class | Experiment No. | Temp. (° C.) | Pressure (kg./cm.$^2$) | LHSV (hr.$^{-1}$) | H$_2$/ketone (mol ratio) | Conversion (percent) | Name | Selectivity (mol percent) |
| 1 | MEK | Zirconium phosphate | 18 | 145 | 7.0 | 2.0 | 0.2 | 8 | MHO | 85 |
| 2 | MEK | Titanium phosphate | 20 | 145 | 7.0 | 2.0 | 0.2 | 7 | MHO | 85 |
| 3 | DEK | Zirconium phosphate | 18 | 105 | 2.0 | 4.0 | 0.2 | 5 | EMHO | 83 |
| 4 | DEK | Titanium phosphate | 20 | 105 | 2.0 | 4.0 | 0.2 | 4 | EMHO | 85 |
| 5 | MIBK | Zirconium phosphate | 18 | 200 | 1.0 | 0.4 | 1.0 | 29 | TMNO | 70 |
| 6 | DNK | do | 18 | 130 | 1.0 | 2.0 | 0.4 | 4 | ONHO | 71 |
| 7 | MCK | do | 18 | 130 | 1.0 | 2.0 | 0.2 | 3 | DCHB | 73 |

EXAMPLE 22

Four ml. of the catalyst obtained in Example 1, Experiment No. 2 was packed into a Pyrex reaction tube of the type used in Example 15. Vapor phase reaction was performed by introducing acetone at 1.77 ml./hr. and hydrogen at 5 ml./min. at a temperature of 150° C. and at atmospheric pressure.

The conversion of acetone was 32.4%, and the selectivities of MIBK and DIBK were 73.1% by weight and 23.0% by weight, respectively.

The prior art methods similar to the present invention have been reproduced as follows:

CONTROL (1).—PREPARATION OF CATALYST (A) Preparation of Catalyst by the Process of DAS 1,260,454

A 20–50 mesh sodium-type resin known as "Dowex 50WX8" (trademark of Dow Chemical) of an amount of 80 grams (94 ml.) in a wet state was immersed in 100 ml. of 2N HCl for 3 hours at room temperature, and then washed with an ion-exchange water. This procedure was repeated twice to convert the resin into the H-type. Thereafter, 30 ml. of 2N HCl containing 2.0 grams of palladium chloride was added, and water was evaporated by means of a rotary evaporator *in vacuo* on a water bath at 60° C. The resulting dried resin was packed into a quartz tube having an inner diameter of 20 mm., and while flowing a hydrogen gas at a rate of 80 ml./min., it was treated for 27 hours at 100° C. to remove substantially all of the remaining HCl in the catalyst. The obtained catalyst was black and weighed 43.1 grams (47.2 ml.).

(B) Preparation of Catalysts by British Pat. 1,015,003

(B–1) Preparation of catalyst consisting of palladium metal supported on $ZrO_2$.—One hundred (100) grams of zirconium oxychloride ($ZrOCl_2 \cdot 8H_2O$) was dissolved into 2 liters of ion-exchange water. While stirring the solution well, a 1:1 ammonia water was gradually added to the solution to adjust the pH of the solution to 9.0. Stirring was continued for further 2 hours after the addition of ammonia, and then the solution was left to stand for 24 hours. The precipitate was separated by filtration, and washed. The obtained hydrogel was dried for 12 hours at 120° C. to form zirconia gel. Fifty (50) grams of zirconia gel was pulverized to a size of 100 to 200 mesh, and put into 50 ml. of 1N HCl having dissolved therein 0.4 grams of palladium chloride. With good stirring, it was subjected to evaporation on a water bath. The obtained dry powder was shaped into pellets each having a size of 5 mm. in diameter and 3 mm. in length to get the intended catalysts.

(B–2) Preparation of a catalyst consisting of palladium metal supported on $Ca_3(PO_4)_2$.—Calcium chloride ($CaCl_2 \cdot 2H_2O$) (39.0 g.; 0.265 mole) was dissolved into 750 ml. of ion-exchange water. Separately, 14.6 grams (0.149 mole) of 87% phosphoric acid and 28.2 ml. (0.726 mole) of 28% $NH_4OH$ were dissolved into 2100 ml. of water. The former solution was added to the latter solution to adjust the pH to 8.4. The resulting precipitate was allowed to stand for 24 hours, washed with water, and then dried at 120° C. Twenty (20) grams of the dried gel was finely pulverized and put into 30 ml. of 1N HCl having dissolved therein 0.17 grams of palladium chloride. With good stirring, it was subjected to evaporation on a water bath. The obtained product was shaped into pellets having a size of 5 mm. in diameter and 3 mm. in length to get the intended catalyst.

(2) HYDROGENATING DIMERIZATION OF ACETONE (2–1) Reproducing experiments of DAS 1,260,454.—Methylisobutyl ketone was produced from acetone under the reaction conditions shown in Table X below using the catalyst of DAS 1,260,454 described in (A) above. The results are shown in Table X.

The reaction tube used in this experiment was of stainless steel and had a length of 500 mm. and an inner diameter of 10 mm. Fifteen (15) ml. of the catalyst was packed into its center. The reaction temperature was measured by a thermocouple wound around the reaction tube.

(2–2) Reproducing experiments of British Pat. 1,015,003.—A pyrex reaction tube having an inner diameter of 20 mm. and a length of 350 mm. was charged at its center with 5 ml. of the catalysts obtained in accordance with the process of British Pat. 1,015,003, described in (B–1) and (B–2) above. While flowing a hydrogen gas into the reaction tube at a rate of 60 ml./min., the catalyst was reduced for 6 hours at 300° C. Thereafter, the condensation saturation reaction of acetone was conducted under the reaction conditions indicated in Table X.

(3) EXPERIMENTAL RESULTS

Some of the experimental conditions of experiments (2–1) and (2–2) and the experimental results obtained are shown in Table X below.

TABLE X

| Run number | Catalyst | Reaction conditions | | | | Results | | | | |
|---|---|---|---|---|---|---|---|---|---|---|
| | | Temperature (° C.) | Pressure (kg./cm.) | LHSV (hr.$^{-1}$) of acetone | $H_2$/acetone mole ratio | Conversion of acetone (percent) | Selectivity (percent) | | | Space time yield of MIBK (g./l. cat./hr.) |
| | | | | | | | MIBK | IPA | DIBK | |
| 1 | A | 130 | 20 | 4 | 0.30 | 25.3 | 90.0 | 5.1 | 4.9 | 688 |
| 2 | A | 130 | 20 | 6 | 0.30 | 17.3 | 91.0 | 4.5 | 4.5 | 715 |
| 3 | A | 110 | 6 | 4 | 0.30 | 12.5 | 87.9 | 7.8 | 2.8 | 303 |
| 4 | A | 110 | 20 | 4 | 0.30 | 13.6 | 83.6 | 14.3 | 1.9 | 314 |
| 5 | B–1 | 200 | 1 | 2 | 0.40 | 1.0 | 50 | | | |
| 6 | B–2 | 200 | 1 | 2 | 0.40 | 0.5 | | | | |

NOTE:
Catalyst A: Catalyst of DAS 1,260,454 prepared in (1)–A above.
Catalysts B–1 and B–2: Catalysts of British Patent 1,051,003 prepared in (1)–B–1 and (1)–B–2 above.
LHSV of acetone: Liquid volume/catalyst volume/hour of acetone.
MIBK: Methylisobutyl ketone.
IPA: Isopropyl alcohol.
DIBK: Diisobutyl ketone.
Space time yield of MIBK: The yield of MIBK in gram per liter of the catalyst per hour.

We claim:

1. A method of producing dimerized saturated ketones which comprises heating at a temperature of 60–400° C. a ketone of 3–19 carbon atoms of the formula:

wherein $R_1$ is selected from the group consisting of alkyl, cycloalkyl, aryl, aralkyl, alkaryl or alkenyl, and $R_2$ and $R_3$ are each independently selected from the group consisting of hydrogen, alkyl, cycloalkyl, aryl, aralkyl, alkaryl or alkenyl, together with hydrogen in the presence of a catalyst comprising metallic palladium and a phosphate of at least one metal selected from the group consisting of zirconium, titanium, hafnium and tin.

2. The method of Claim 1 wherein said heating is conducted at a temperature ranging between 80° and 250° C.

3. The method of Claim 1 wherein the pressure inside the reaction system is adjusted to 1–60 kilograms per square centimeter.

4. The method of Claim 3 wherein the pressure inside the reaction system is adjusted to 10–50 kilograms per square centimeter.

5. The method of Claim 1 wherein said reaction is carried out in the liquid phase.

6. The method of Claim 1 wherein the mole ratio of hydrogen to said ketone component is within the range of from 0.1–1.0:1.

7. The method of Claim 1 wherein said catalyst contains 1.0–5.3% by weight, based on the metal phosphate, of metallic palladium.

8. The method of Claim 1 wherein said palladium is supported by said metal phosphate.

9. The method of Claim 1 wherein said catalyst is obtained by contacting in aqueous medium, a water soluble salt of at least one metal selected from the group consisting of zirconium, titanium, hafnium and tin and phosphoric acid, adjusting the pH to 3–12 by addition of ammonia or caustic alkali to obtain a metal phosphate, followed by contacting said metal phosphate with an aqueous solution of a water soluble palladium compound selected from the group consisting of the nitrates, sulfates and halides of palladium, adjusting the pH to 3.0–10.0 by addition of ammonium hydroxide, methyl amine or ethyl amine and thereafter reducing the metal phosphate by heating at 100°–600° C. in a stream of hydrogen.

10. A method of producing dimerized saturated ketones which comprises heating at a temperature of 60–400° C. a ketone component selected from the group consisting of acetone, methyl ethyl ketone, methyl isobutyl ketone and diethyl ketone, together with hydrogen in the presence of a catalyst comprising metallic palladium and a phosphate of at least one metal selected from the group consisting of zirconium, titanium, hafnium and tin.

References Cited

UNITED STATES PATENTS

| | | | |
|---|---|---|---|
| 3,405,178 | 10/1968 | Wollner et al. | 260—593 R |
| 3,379,766 | 4/1968 | Hwang et al. | 260—593 R |
| 3,542,878 | 11/1970 | Swift | 260—586 R |
| 3,361,828 | 1/1968 | Robbins et al. | 260—593 R |
| 3,555,105 | 1/1971 | Nolan et al. | 252—437 |

LEON ZITVER, Primary Examiner

N. MORGENSTERN, Assistant Examiner

U.S. Cl. X.R.

252—437; 260—590, 592, 593 R

UNITED STATES PATENT OFFICE
CERTIFICATE OF CORRECTION

Patent No. 3,829,495  Dated August 13, 1974

Inventor(s) Yukio Mizutani et al

It is certified that error appears in the above-identified patent and that said Letters Patent are hereby corrected as shown below:

In the Heading, insert patentees' foreign application priority data as follows:

-- Claims priority, application Japan, August 2, 1968, 43/54297 and 43/54298. --

Signed and sealed this 17th day of December 1974.

(SEAL)
Attest:

McCOY M. GIBSON JR.  C. MARSHALL DANN
Attesting Officer  Commissioner of Patents